June 1, 1965 E. STUMP 3,186,516
BRAKE INSTALLATION FOR MOTOR VEHICLES
Filed July 28, 1961
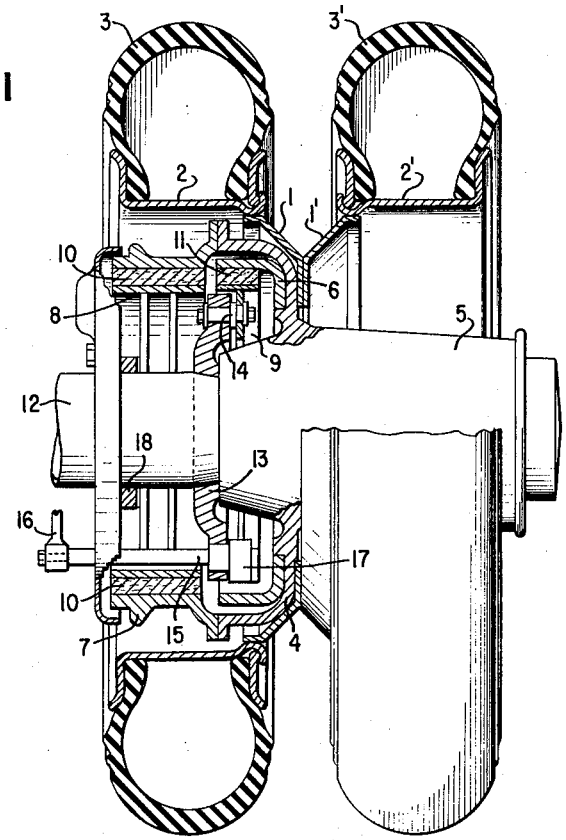
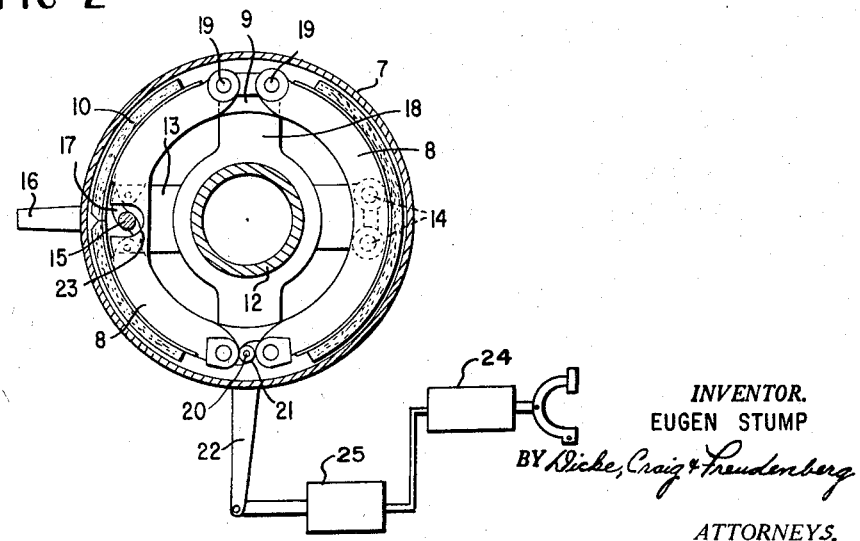
INVENTOR.
EUGEN STUMP
BY Dicke, Craig & Freudenberg
ATTORNEYS.

United States Patent Office 3,186,516
Patented June 1, 1965

3,186,516
BRAKE INSTALLATION FOR MOTOR VEHICLES
Eugen Stump, Stuttgart-Unterturkheim, Germany, assignor to Daimler-Benz Aktiengesellschaft, Stuttgart-Unterturkheim, Germany
Filed July 28, 1961, Ser. No. 127,553
Claims priority, application Germany, July 30, 1960, D 33,915/60
8 Claims. (Cl. 188—18)

The present invention relates to a brake mechanism, especially for twin-tire wheel assemblies of motor vehicles provided with two mutually independent drum-type brakes.

The present invention is concerned with an improvement and further development of brake installations, especially for wheels of motor vehicles having twin tires and two drum brakes which are operative mutually independently.

The present invention essentially consists in arranging the two brake drums adjacent each other, especially coaxially to each other, and to secure the two brake drums at a flange ring of the wheel hub directly at the wheel inside.

Long massive connecting shaft pieces between the two brake installations or between the brake installations and the wheels are effectively avoided by the present invention.

Accordingly, it is an object of the present invention to provide a brake installation for wheels of motor vehicles, especially those having twin tires, which are provided with mutually independent brake installations, especially drum brake installations, which improves reliability and operating efficiency of such an installation.

It is another object of the present invention to provide a brake installation for twin wheels of motor vehicles provided with drum brakes actuatable mutually independently, which effectively eliminates relatively heavy connecting parts and therewith reduces the spatial requirements as well as the rotating masses of the brake installation.

A still further object of the present invention resides in the provision of a brake installation for mutually independent drum brakes adapted to be installed in wheels of motor vehicles having twin-tires which enables the use of mutually independent brake actuating mechanisms without complicated connecting structures or encumbrances in the relatively small space available.

A further object of the present invention resides in the provision of a brake installation for wheels of motor vehicles, especially those having twin tires, which permits the use of two independently actuatable drum brakes offering relatively large braking surfaces requiring only relatively few simple structural parts and assuring safe and reliable braking action for both wheels.

These and further objects, features and advantages of the present invention will become more obvious from the following description when taken in connection with the accompanying drawing which shows, for purposes of illustration only, one embodiment in accordance with the present invention, and wherein FIGURE 1 is an end elevational view, partially in cross section of a wheel of a motor vehicle provided with twin tires and a brake installation according to the present invention, and FIGURE 2 is a somewhat schematic partial transverse cross sectional view of the arrangement of the brakes for the wheel of FIGURE 1.

Referring now to the drawing wherein like reference numerals are used throughout the two views to designate corresponding parts, and more particularly to FIGURE 1, the wheel rim carriers or wheel disks of the twin wheel are designated therein by reference numerals 1 and 1', respectively. The wheel rims 2 and 2' are suitably secured to the rim carriers or wheel disks 1 and 1' and carry thereon, in a manner known per se, the tires 3 and 3'. The wheel disks 1 and 1' are disposed directly adjacent each other and are secured at a bell-shaped flange 4 of the wheel hub 5. A brake drum 6 shaped similarly to the bell-shaped flange 4 is accommodated within the flange 4. A second brake drum 7 is suitably secured at the outer end face of the flange 4. The brake shoes 9 are adapted to engage or abut with the brake linings 11 thereof against the brake drum 6 whereas the brake shoes 8 are adapted to engage or abut with the brake linings 10 thereof against the brake drum 7. A traverse or cross arm 13 operative as brake shield or brake mask is securely mounted on the wheel axle 12 between the two brake drums 6 and 7. The brake shoes 9 are pivotally secured at 14 in any conventional manner to the traverse 13. Also the brake shaft 15 associated therewith is supported in the traverse 13. The brake shaft 15 is actuated by a lever 16 in any suitable manner known in the prior art and an expanding or spreading cam 17 provided, in a manner known per se, between the brake shoe is displaced or pivoted thereby.

A second traverse or cross arm 18 is securely mounted on the axle shaft 12 at a certain distance in front of the brake screen traverse 13. The traverse 18 carries the pivot bearings 19 for the brake shoes 8. Additionally, the brake shaft 20 acting on the brake shoes 8 is mounted on the traverse 18 which brake shaft 20 also displaces or pivots a brake cam 21 seated at the inner end thereof. The brake shaft 20 is actuated by a conventional lever 22. An aperture or cut-out portion 23 (FIGURE 2) is provided within one of the brake shoes 8 of the brake mechanism disposed along the inner side of the vehicle for the passage of the shaft 15 for the outer brake installation. The aperture 23 can be dispensed with if the shaft 15 is arranged at a different place, for example, between the brake shoe bearings 19. The arrangement is also so made that the two brake installations are displaced with respect to each other by about 90 to 100°.

The operation of the brake installation according to the present invention is clear from a consideration of the drawing. The brake mechanism 8, 10 is actuated during swinging movement or pivoting movement of the lever 22 whereas the brake mechanism 9, 11 is actuated during swinging or pivoting movement of the lever 16.

In the embodiment illustrated and described hereinabove, the brake installation 9, 11 is provided as auxiliary hand brake and the brake installation 8, 10 as main brake actuated, for example, by a suitable pressure medium, such as, a conventional master brake cylinder 24 and piston actuator 25 combination schematically shown in FIGURE 2.

However, it is also within the purview and scope of the present invention to reverse this arrangement and to utilize the brake installation 9, 11 as main brake.

While I have shown and described one embodiment in accordance with the present invention, it is obvious that the same is not limited thereto but is susceptible of many changes and modifications within the spirit and scope thereof, and I therefore do not wish to be limited to the details shown and described herein, but intend to cover all such changes and modifications as are encompassed by the scope of the appended claims.

I claim:
1. A brake installation, especially for twin wheels of motor vehicles having a wheel axle and two mutually independent drum brakes disposed about the wheel hub, comprising first brake drum means, second brake drum means arranged adjacent said first brake drum means, first brake shoe means associated with said first brake drum means, second brake shoe means associated with said second brake drum means, said wheel hub being provided with substantially bell-shaped annular flange means, traverse brake shield means disposed between said first and second brake shoe means and secured to said wheel axle, the brake shoe means associated with one of said brake drum means being pivotally mounted on said traverse brake shield means, actuating shaft means for said one brake shoe means supported by said traverse brake shield means, and means for securing both of said brake drum means directly to said flange means including connecting means connecting said one of said brake drum means substantially within said bell-shaped flange means.

2. A brake installation, especially for twin wheels of motor vehicles having a wheel axle and two mutually independent drum brakes disposed about the wheel hub, comprising first brake drum means, second brake drum means arranged adjacent said first brake drum means, first brake shoe means associated with said first brake drum means, second brake shoe means associated with said second brake drum means, said wheel hub being provided with substantially bell-shaped annular flange means, traverse brake shield means disposed between said first and second brake shoe means and secured to said wheel axle, the brake shoe means associated with one of said brake drum means being pivotally mounted on said traverse brake shield means, actuating shaft means for said one brake shoe means supported on said traverse brake shield means, and means for securing both of said brake drum means directly to said flange means including first connecting means connecting said one of said brake drum means within said bell-shaped flange means, and second connecting means connecting the other brake drum means to the free end of said flange means.

3. A brake installation, especially for twin wheels of motor vehicles having a wheel axle and two mutually independent drum brakes disposed about the wheel hub, comprising first brake drum means, second brake drum means arranged adjacent said first brake drum means, first brake shoe means associated with said first brake drum means, second brake shoe means associated with said second brake drum means, said wheel hub being provided with substantially bell-shaped annular flange means, traverse brake shield means disposed between said first and second brake shoe means and secured to said wheel axle, the brake shoe means associated with said first brake drum means being pivotally mounted on said traverse break shield means, actuating shaft means for said first brake shoe means supported on said traverse brake shield means, further traverse brake shield means disposed within the second brake drum means and secured to said wheel axle, the brake shoe means associated with said second brake drum means being pivotally mounted on said further traverse brake shield means, further actuating shaft means for said second brake shoe means supported on said further traverse brake shield means, and means for connecting both of said brake drum means directly to said flange means for support thereby including first connecting means connecting first of said brake drum means within said bell-shaped flange means, and second connecting means connecting said second brake drum means to the free end of said flange means.

4. A brake installation, especially for twin wheels of motor vehicles having a wheel axle and two mutually independent drum brakes disposed about the wheel hub, comprising first brake drum means, second brake drum means arranged adjacent said first brake drum means, first brake shoe means associated with said first brake drum means, second brake shoe means associated with said second brake drum means, said wheel hub being provided with annular flange means, traverse brake shield means disposed between said first and second brake shoe means and secured to said wheel axle, the brake shoe means associated with one of said brake drum means being pivotally mounted on said traverse brake shield means, actuating shaft means for said one brake shoe means supported on said traverse means, further traverse brake shield means disposed within the other brake drum means and secured to said wheel axle, the brake shoe means associated with said other brake drum means being pivotally mounted on said further traverse brake shield means, further actuating shaft means for said last-mentioned brake shoe means supported on said further traverse means, and means for securing both of said brake drum means directly to said flange means.

5. A brake installation, especially for two wheels of motor vehicles having two mutually independent drum brakes disposed about the wheel hub, comprising first brake drum means, second brake drum means arranged adjacent said first drum means, first brake shoe means associated with said first brake drum means, second brake shoe means associated with said second brake drum means, said wheel hub being provided with substantially bell-shaped annular flange means, and means for securing both of said brake drum means directly to said flange means including first connecting means connecting one of said brake drum means within said bell-shaped flange means, and second connecting means connecting the other brake drum means to the free end of said flange means.

6. A brake installation as defined in claim 3, wherein the two mutually independent brake systems formed by said first brake drum means and brake shoe means and said second brake drum means and brake shoe means are displaced relative to each other by between approximately 90 and 100°.

7. A brake installation as defined in claim 3, wherein said second brake shoe means which is disposed closer to the vehicle center is provided with an aperture for the passage therethrough of said actuating shaft means for said first brake shoe means.

8. A brake installation as defined in claim 3, wherein the first brake system formed by said first brake drum means and brake shoe means is a hydraulic brake system and the second brake system formed by said second brake drum means and brake shoe means is a manually actuatable brake system adapted to be operated independently of said first brake system.

References Cited by the Examiner
UNITED STATES PATENTS

| | | | |
|---|---|---|---|
| 1,828,061 | 10/31 | Morgan | 188—79 |
| 2,154,497 | 4/39 | Durham | 188—18 |
| 2,289,166 | 7/42 | Ash | 188—18 |
| 2,790,517 | 4/57 | Bennett | 188—79 |
| 2,985,260 | 5/61 | White | 188—79 |

ARTHUR L. LA POINT, *Primary Examiner.*

A. JOSEPH GOLDBERG *Examiner.*